United States Patent [19]

Hirata

[11] 3,991,277
[45] Nov. 9, 1976

[54] FREQUENCY DIVISION MULTIPLEX SYSTEM USING COMB FILTERS

[76] Inventor: Yoshimutsu Hirata, No. 10-307 Araidanchi, 842 Arai, Hino, Tokyo, Japan

[22] Filed: Feb. 11, 1974

[21] Appl. No.: 441,285

[30] Foreign Application Priority Data

| | | |
|---|---|---|
| Feb. 15, 1973 | Japan | 48-18695 |
| Feb. 15, 1973 | Japan | 48-18696 |
| Apr. 24, 1973 | Japan | 48-46544 |
| Apr. 24, 1973 | Japan | 48-46545 |

[52] U.S. Cl. ........................... 179/15 FD; 333/70 T
[51] Int. Cl.² ............................................. H04J 1/08
[58] Field of Search ............... 179/15 FD, 15.55 R; 333/70 T, 28 R, 18; 328/167

[56] References Cited
UNITED STATES PATENTS

| | | | |
|---|---|---|---|
| 3,079,464 | 2/1963 | Baumel | 179/15 FD |
| 3,315,171 | 4/1967 | Becker | 333/70 T |
| 3,543,009 | 11/1970 | Voelcker | 333/70 T |
| 3,809,923 | 5/1974 | Esser | 333/70 T |

Primary Examiner—Kathleen H. Claffy
Assistant Examiner—Joseph A. Popek
Attorney, Agent, or Firm—Edwin E. Greigg

[57] ABSTRACT

Disclosed herein is a novel frequency division multiplex system for use in connection with transient signals such as speech and music signals. One embodiment includes a pair of comb filters, the response characteristics of which are staggered so that the pass bands of one comb filter are in alignment with the attenuation bands of the other comb filter. Each channel signal is filtered by its associated comb filter and then combined to develop a comb frequency division duplex (CFDD) signal for transmission over a transmission medium. At the receiving terminal the CFDD signal is decombined into the individual channels and passed through another pair of comb filters, the response characteristic of each comb filter being the same as that of the comb filter in a corresponding input channel. In another embodiment, a recording and playback system is provided to record the CFDD signal, i.e., two channels of information in a single track on disc or tape and to playback such recorded information. This invention is based on the observation that the attenuation of some of the frequencies in audio signals does not materially degrade the naturalness and intelligibility of the signals.

15 Claims, 10 Drawing Figures

FREQUENCY DIVISION MULTIPLEX SYSTEM USING COMB FILTERS

BACKGROUND OF THE INVENTION

This invention relates to multiplex systems and, more particularly, to frequency division multiplexed systems using comb filters.

Various types of multiplex are available to permit sharing of one transmission link capability on frequency-division and time-division bases. In conventional frequency-division systems, the transmitting terminal modulates each channel to a particular frequency assignment, each channel being assigned to a unique part of the carrier frequency spectrum. The modulation technique may be amplitude modulation or frequency modulation. In the field of speech signal transmission, one recent and continuous trend has been the reduction in the bandwidth of each channel in order to increase the number of multiplex channels to be accommodated in a single transmission link. One result of this effort is a vocoder. In a vocoder, low frequency control signals representative of a speech signal are derived at an analyzer. These control signals are then transmitted over a narrow bandwidth transmission channel to a synthesizer where they are used to construct a replica of the speech signal. However, such devices are both complicated and expensive, which frequently prohibits utilization of vocoders in usual environments even though performance characteristics favor use of such devices.

OBJECTS AND SUMMARY OF THE INVENTION

It is therefore an object of this invention to provide a novel frequency division multiplex system for use in connection with transient signals such as speech and music signals.

It is another object of this invention to provide a frequency division multiplex system using comb filters.

It is yet another object of this invention to provide a frequency division multiplex system which permits frequency multiplexing without an increase in frequency spectrum occupancy.

It is still another object of this invention to provide a frequency division multiplex system which is efficient in operation and which utilizes a minimum of components.

It is a further object of this invention to provide a frequency division duplex system for use with existing multiplex systems and capable of doubling the transmission capacity of the systems.

It is still further object of this invention to provide a frequency division duplex system for use in multi-channel recording and reproducing systems.

These and other objects of the invention are accomplished by providing first and second comb filters in each of a plurality of input and output signal channels, respectively. More particularly, in a duplex system according to one embodiment of this invention, each channel signal is passed through its associated first comb filter and combined with each other to develop a comb frequency division duplex (CFDD) signal for transmission over a transmission medium. The response characteristics of the first comb filters are staggered so that the pass bands of one filter are in alignment with the attenuation bands of the other filter. At the receiving terminal the CFDD signal is decombined into the two channels and passed through the respective second comb filters. Each of the second comb filters has a response characteristic similar to the first comb filter in a corresponding input signal channel. The filtered output from each second comb filter is supplied to the desired utilization means, such as a loudspeaker or earphone. In another embodiment, a conventional recording and playback system is provided to record the CFDD signal, i.e., two channels of information in a single track on disc or tape and to playback such recorded information.

The novel features that are considered characteristics of this invention are set forth with particularity in the appended claims. The invention will best be understood from the following description when read in connection with the accompanying drawings.

DESCRIPTION OF THE PREFERRED EMBODIMENTS

Figure 1:
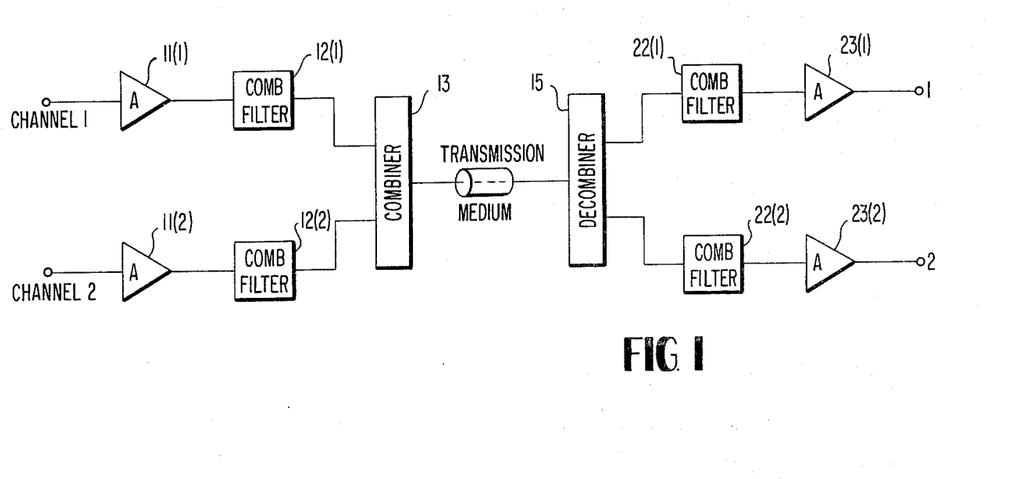
FIG. 1 is an overall block diagram illustrating a frequency division duplex system according to one preferred embodiment of this invention.

Reference is now made to FIG. 1 which illustrates a frequency division duplex system constructed in accordance with the teachings of this invention. In this system, two channels 1 and 2 are combined to develop a comb frequency division duplex (CFDD) signal which is decombined into two corresponding channels.

In the transmitting terminal of the duplex system, each channel signal is amplified by an amplifier 11(1), 11(2) and filtered by a comb filter 12(1), 12(2). Such filters may be of the analog or digital type. The output of each comb filter is fed to a combiner circuit 13 where it is combined with each other to form the CFDD signal for transmission across a transmission medium. It is to be noted that the transmission medium may be a telephone line, coaxial cable, or radio frequency carrier wave, etc.. Although not specifically shown, the signal may be propagated through the transmission medium by means of a transmitter at the transmitting terminal and be detected by a receiver at the receiving terminal of the duplex system illustrated in FIG. 1.

The receiving terminal also includes a decombiner circuit 15 connected to the receiver in series. The decombiner circuit separates the received CFDD signal into the two individual channels 1 and 2. Each channel has a comb filter 22(1), 22(2) which selects from the decombiner circuit the particular frequency components of the CFDD signal transmitted from the transmitting terminal. As will be described later in detail, the comb filter 22(1) has a response characteristic similar to the comb filter 12(1), while the comb filter 22(2) has a response characteristic similar to the comb filter 12(2). After filtering, the signal of each channel is fed to an amplifier 23(1), 23(2) and then to the desired utilization means, such as a loudspeaker or earphone (not shown).

Figure 2A:
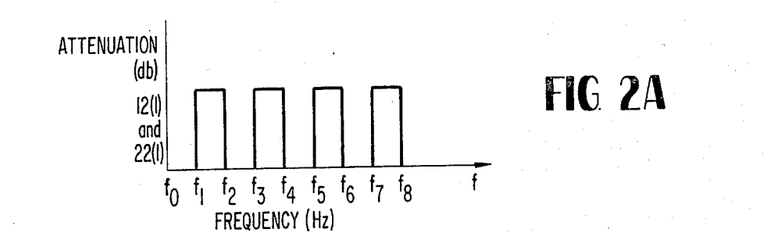
FIGS. 2A and 2B depict the ideal response characteristics of two pairs of comb filters employed in the system of FIG. 1.
Figure 2B:
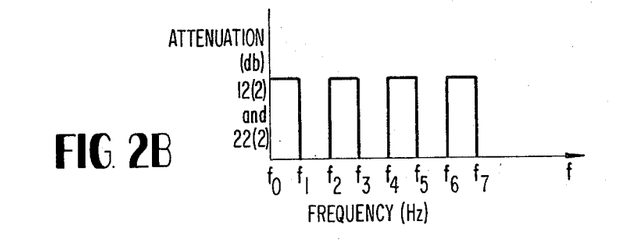

The ideal response characteristics of the respective comb filters 12(1), 22(1) and 12(2), 22(2) are illustrated in FIGS. 2A and 2B, respectively. It should be noted that there are many alternate stop (or attenuation) and pass bands throughout the frequency spectrum of the band of signal energy to be transmitted. Further, it is to be noted that the attenuation bands of the comb filters in one channel, e.g., 12(1) and 22(1) coincide with the pass bands of the comb filters of the other channel 12(2) and 21(2). Therefore, any signal which passes through the comb filter 12(1) will be passed through the comb filter 22(1) but will be attenuated by the comb filter 22(2). Likewise, any signal which passes through the comb filter 12(2) can pass through only the comb filter 22(2). Stated another way, a signal originating in channel 1 will pass through the comb filter 12(1) to the combiner circuit 13. Since frequencies in the signal which fall into the attenuation bands of the comb filter 12(1) are attenuated by the comb filter, only those frequencies falling into the pass bands of the comb filter 12(1) will be passed on to one input of the combiner circuit 13. In the case of a signal originating in channel 2, only those frequencies falling into the pass bands of the comb filter 12(2) will appear at the other input of the combiner circuit 13. Because of the staggered relationship of the response characteristics of the comb filters 12(1) and 12(2), both filtered signals are combined complementarily by the combiner circuit 13 to provide the CFDD signal.

At the receiving terminal, the comb filter 22(1) will attenuate all those frequencies of the CFDD signal falling into the attenuation bands of the filter, resulting in an output signal similar to the output of the comb filter 12(1) in channel 1. Likewise, the output from the comb filter 22(2) is a signal having similar frequency components to that leaving the comb filter 12(2). Thus, it is seen that with this arrangement two channel signals are combined to develop the CFDD signal having a bandwidth equal to that of one channel signal and then decombined into two individual channels.

As is well known, if certain frequencies are removed in ordinary speech signal, the signal will still be intelligible. Further, my recent experiments have revealed that if the width of, and the distance between the pass bands of comb filters are properly chosen, the signal as heard at the receiving terminal will be subjected to little or substantially no degradation in terms of naturalness. These observations are made use of in the present invention.

Figure 3:
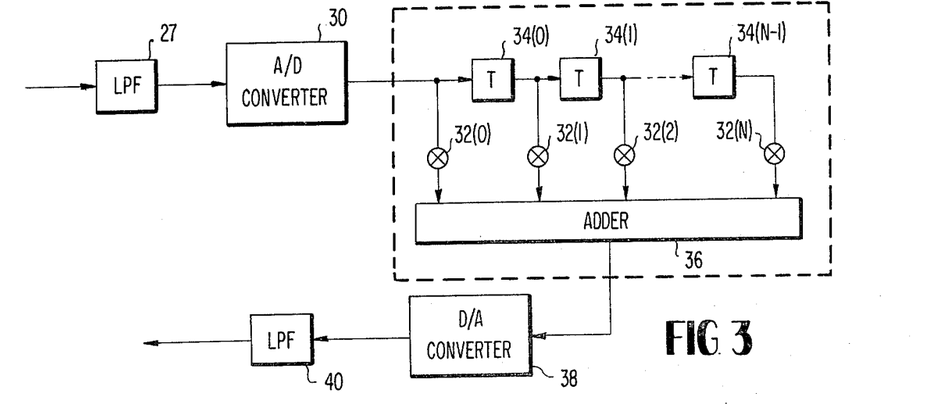
FIG. 3 is a block diagram of a nonrecursive digital filter having a comb signal characteristic.

Reference is now made to FIG. 3 which illustrates a block diagram of a typical example of the comb filter shown in FIG. 1. The comb filter as depicted comprises a nonrecursive digital filter 25 of the tapped-delay-line configuration. An analog input is low-pass filtered by a filter 27 and then converted to a digital signal by an analog-to-digital converter 30 before being applied to the digital filter 25. In the nonrecursive digital filter of FIG. 3, the input, i.e., a signal representative of sequential digitally coded samples of the information to be processed by the filter is applied to a multiplier 32(0) and to a delay unit 34(0). The multiplier 32(0) multiplies the applied samples by digitally coded coefficient $a_0$ and applies the resulting products to an adder 36. The adder 36 combines each product generated by a multiplier 32(0) with other products simultaneously generated as discussed below. The output signal of the adder 36 is the filtered output signal of the nonrecursive digital filter 25. Samples applied to the delay unit 34(0) are delayed by the time, $\tau$, required for one filter cycle and then applied to a multiplier 32(1) and a delay unit 34(1). In this embodiment, $\tau$ is equal to the sampling interval T. The multiplier 32(1) performs a function similar to the multiplier 32(0), multiplying each sample applied to it by coefficient $a_1$, and applying the resulting product to the adder 36. The delay unit 34(1), similar to the delay unit 34(0), delays each sample applied to it by the time $\tau$ before applying it to the next multiplier, e.g., a multiplier 32(2) and the next delay unit, e.g., a delay unit 34(2) (not shown), in the progression of multipliers and delay units. All of devices 32 and 34 being respectively similar, they all perform in like fashion. The resultant filtered signals appearing at the output of the adder 36 are converted to analog form by a digital-to-analog converter 38 and low-pass filtered by a filter 40 to produce a continuous waveform. The output from the low-pass filter 40 is supplied to the combiner circuit 13. It should be noted, in this connection, that the digital output from the adder 36 could be first combined with that from the adder of the comb filter in the other channel and then be converted to analog form by the digital-to-analog converter.

It is well known that, in the implementation of the filter configuration shown in FIG. 3, digital delay lines and bistable multivibrators are commonly used for delay units, while any of several types of multipliers can be employed to perform the necessary multiplications. There are also several well known types of adders suitable for use in summing the simultaneously generated products.

In general, the frequency response of the digital filter of FIG. 3 is defined as $$B(f) = \sum_{n=0}^{N} a_n \exp(j 2\pi n T f)$$

where $a_n$=filter coefficient; $j = \sqrt{-1}$; T=the sampling interval; and $f$=the input signal frequency.

Assuming now that $a_0=1$, $a_1=1$, $a_n=0$ ($n \geq 2$), the frequency response of $B(f)$ in terms of its amplitude would be $B(f) = 2 \cos(\pi T f)$ Assuming, on the other hand, that $a_0=1$, $a_1=-1$, $a_n=0$ ($n \geq 2$), the frequency response would be $B(f) = 2 \sin(\pi T f)$ It is to be noted that a sequence of filter coefficients $a_n$ required to realize the simplest form of digital filter for practical use is:

$a_0 = a_2 = 1$, and $a_1 = 2$, yielding $B_1(f) = 4 \cos^2(\pi T f)$ and that a complementary sequence of filter coefficients is:

$a_0 = a_2 = -1$, and $a_1 = 2$, yielding $B_2(f) = 4 \sin^2(\pi T f)$

Figure 4:
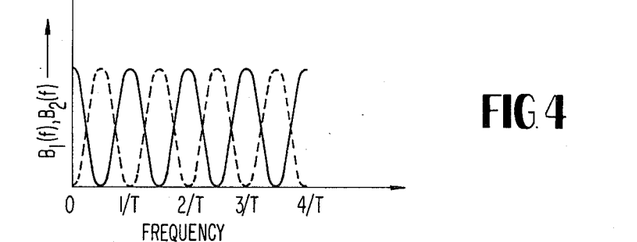
FIG. 4 depicts the response characteristics of a pair of complementary digital filters of the type shown in FIG. 3.

As seen in FIG. 4, $B_1(f)$ and $B_2(f)$ represent a pair of complementary comb signal characteristics required to realize the concept of the present invention. These values of coefficients are shown in Table I. Also shown in the Table I are other pairs of sequence of filter coefficients providing complementary comb signal characteristics.

Table I

| Normalized frequency response $B(f)/R$ | Sequence of coefficients $a_n$ |
|---|---|
| cos X | 1, 1. |
| sin X | 1, −1. |
| $\cos^2 X$ | 1, 2, 1. |
| $\sin^2 X$ | −1, 2, −1. |
| $\cos^3 X$ | 1, 3, 3, 1. |
| $\sin^3 X$ | 1, −3, 3, −1. |
| $\cos^4 X$ | 1, 4, 6, 4, 1. |
| $\sin^4 X$ | 1, −4, 6, −4, 1. |
| cos X cos 2X | 1, 1, 1, 1. |
| sin X sin 2X | 1, −1, 1, −1. |
| $\cos^2 X \cos^2 2X$ | 1, 2, 3, 4, 3, 2, 1. |
| $\sin^2 X \cos^2 2X$ | −1, 2, −3, 4, −3, 2, −1. |

It is to be noted that in comb filters of the type having a response characteristic defined as $\cos^n(\pi T f)$ and $\sin^n(\pi T f)$, the width of the pass bands decreases with an increase of $n$, where $n$ equals the number of coefficients minus one in the case of the filter of FIG. 3. further, it should be noted that the distance between each two adjacent pass bands of the filter decreases with an increase of delay time T provided by each delay unit 34. As will be understood, the design requirements of comb filters depend upon the environment where the comb filters are used.

In general, multiplex system characteristics and arrangements are based upon speech-transmission requirements as standard. For example, in the case of expensive multiplex systems involving communication satellites, one of the most important considerations is to maximize efficiency of transmission in terms of bandwidth even if this would sacrifice the quality or naturalness of the speech signal as heard at the receiving terminal. In this connection, it is to be noted that in cases where the concept of FIG. 1 is utilized to double the transmission capacity of each channel of the existing multiplex systems, it will suffice to employ comb filters of the $\cos^4(\pi f T)$ and $\sin^4(\pi f T)$ type with a delay time T equal to from 3 to 10 milliseconds. With a delay of 5 milliseconds, for example, the distance between the pass bands of the comb filters is in the neighbourhood of 200 Hz.

Another important possibility of utilizing the concept of this invention resides in stereo broadcasting, i.e., the broadcasting of two channel signals over a single transmission channel. It has been found that, in general, the quality or naturalness of the signal as heard at the receiving terminal is improved as n decreases. In the transmission of relatively high fidelity audio signals such as music signals, it is important that the quality or naturalness of the signals be subjected to little or substantially no degradation. However, viewed another way, it can be safely said that the above-mentioned requirement would be satisfied if such degradation of the signal could not be aurally discernible by an ordinary listener at the receiving terminal. My recent experiments have also revealed that in such applications, and with a degree of stereo separation of approximately 10 db, it would be advisable to employ comb filters of the $\cos^2(\pi T f)$ and $\sin^2(\pi T f)$ type having a delay time T equal to approximately 10 milliseconds. In this case, the passband width of the comb filters is substantially equal to the passband distance, being in the neighbourhood of 100 Hz.

Figure 5:
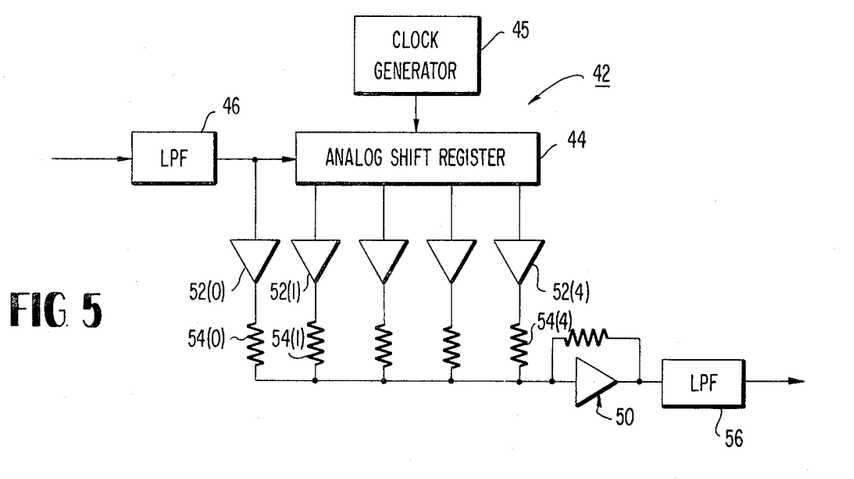
FIG. 5 is a block diagram of an analog sampling filter having a comb signal characteristic.

Reference is now made to FIG. 5 which illustrates an analog sampling filter constructed on the same principle as that of the digital filter of FIG. 3. The analog sampling filter 42 includes a four-stage analog shift register 44 commonly known as the "bucket brigade" devices and is connected to a low-pass filter 46 in series to receive an analog signal. The bucket brigade device is a charge transfer device of the type sold under the designation of M31 by Amperex Electronic Corporation (U.S.A.) or TCA-350 by Inter Metal (West Germany) and comprises a p-channel MOS integrated circuit with a number of stages. The analog shift register 44 is also supplied with timing or sampling signals from a clock generator 45 to sample the input signal and then to effect a transfer of charges representative of such sampled signals from one stage to the next in response thereto. By selecting the frequency of the timing or sampling signals to be an appropriate value greater than the double of input signal frequency, it is possible to provide the desired time delay for each bucket brigade device. Each bucket brigade device is connected to the input of an operational amplifier 50 through a buffer amplifier 52 and a resistor 54 acting as a multiplier. The operational amplifier 50 acts as a current-voltage signal translator as well as an adder. The output of the operational amplifier 50 is coupled to a low-pass filter 56. Since the analog shift register operates directly on analog signals, there is no necessity for providing analog-to-digital and digital-to-analog converters at the input and output sides of the analog sampling filter, respectively. With the four delay units and five multipliers provided as in the case of FIG. 5, the analog sampling filter can provide a comb filter of the $\sin^4(\pi T f)$ or $\cos^4(\pi T f)$ type shown in Table I.

Figure 6:
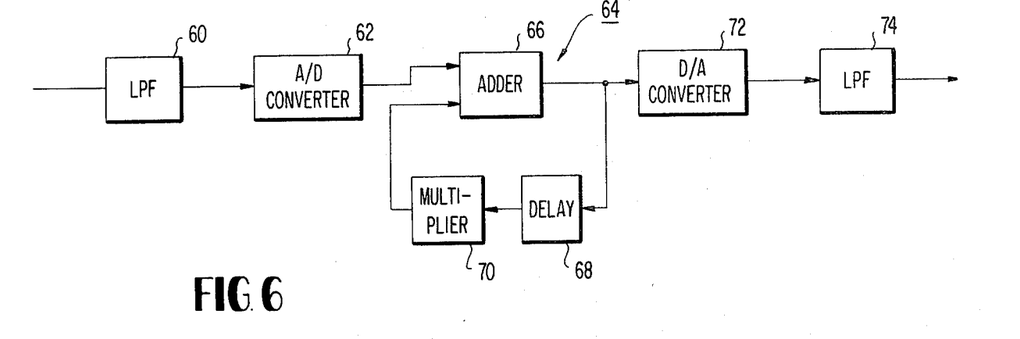
FIG. 6 is a block diagram of a recursive digital filter having a comb signal characteristic.

Reference is now made to FIG. 6 which illustrates a block diagram of another digital filter configuration commonly known as a "recursive digital filter". Similar to the arrangement of FIG. 3, an analog signal is low-pass filtered by a filter 60 and converted to a sequence of digitally coded samples by an analog-to-digital converter 62 before being applied to the recursive digital filter 64. Each sample is passed through an adder 66 and applied to a delay unit 68. The delay unit 68 delays each sample applied to it by the time T before applying it to a multiplier 70. The multiplier 70 multiplies the applied samples by a digitally coded coefficient r and applies the resulting products to a second input of the adder 66. The output signal of the adder 66 is the output signal of the recursive filter 64. The digital output of the recursive filter 64 is converted to an analog signal by a digital-to-analog converter 72 and low-pass filtered by a filter 74. It should be understood that the digital output of the recursive filter 64 could be first combined with that from the recursive filter in the other channel and then be converted to analog form by the digital-to-analog converter.

The frequency response of the recursive digital filter of FIG. 6 is defined in absolute normalized form as follows:

$$A_1(f) = \left[\cos^2(\pi Tf) + \left(\frac{1-r}{1+r}\right)^2 \sin^2(\pi Tf)\right]^{1/2} \cdot Q(f); \quad (1>r>0); \text{ and}$$

$$A_2(f) = \left[\sin^2(\pi Tf) + \left(\frac{1+r}{1+r}\right)^2 \cos^2(\pi Tf)\right]^{1/2} \cdot Q(f); \quad (-1<r<0)$$

where $r$ = filter coefficient, $T$ = the delay time, and $$Q(f) = \prod_{n=1}^{\infty} \left[\cos^2(2^n \pi Tf) + \left(\frac{1-r^m}{1+r^m}\right)^2 \sin^2(2^n \pi Tf)\right]; \quad (m=2^n).$$

It is to be noted that $A_1(f)$ and $A_2(f)$ represent complementary comb signal characteristics required to act as the comb filters of FIG. 1.

Figure 7:
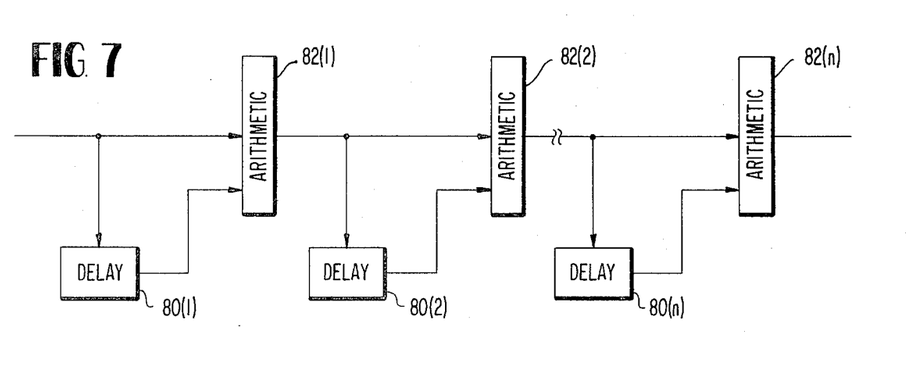
FIG. 7 is a block diagram of another form of comb filter comprising an n-stage delay positive (or negative) feed-forward circuit.

Attention is now called to FIG. 7 which illustrates a block diagram of a further example of comb filter comprising an n-stage delay positive (or negative) feed-forward circuit. As shown, each stage of the circuit comprises a delay unit 80, and an arithmetic unit 82 for arithmetically combining delayed and undelayed signals. The arithmetic unit 82 performs the function of adding or subtracting the two input signals at the amplitude ratio of 1:1.

The frequency response of one stage of the filter of FIG. 7 is defined as $$B_1(f) = \cos(\pi Tf)$$

$$B_2(f) = \sin(\pi Tf)$$

depending upon whether the input signals are summed or substrated. This means that if $$T = n \frac{1}{f} \text{ or } (n + \frac{1}{2}) \frac{1}{f}$$

($f$= input signal frequency), the arithmetic unit 82 will cancel the delayed and undelayed signals. It will be understood that the connection in series of n filters of the type shown in FIG. 7 yields the response characteristics as defined below:

$$B_{1n}(f) = \cos^n(\pi Tf); \text{ and}$$

$$B_{2n}(f) = \sin^n(\pi Tf).$$

Further, it is to be noted that in the arrangement of FIG. 7, it would be possible to vary the degree of attenuation of signal energy in its attenuation bands by selecting the delay time of each delay unit 80 to be successively different in either ascending or descending order.

Figure 8:
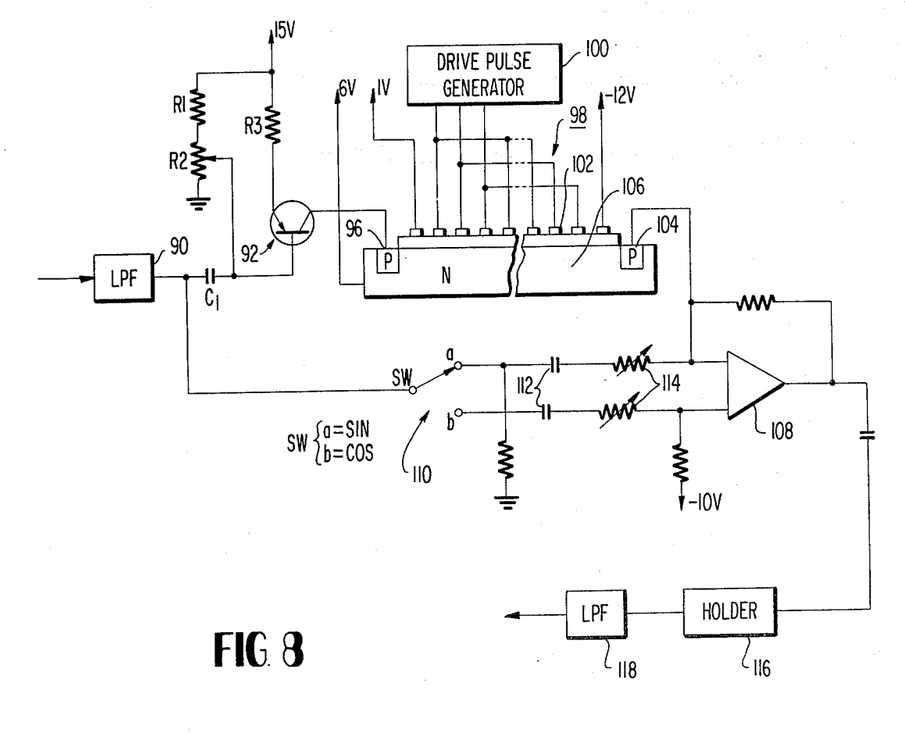
FIG. 8 is a circuit diagram illustrating one stage of the comb filter shown in FIG. 7.

In FIG. 8, there is shown, in circuit diagram, a typical example of the comb filter configuration of FIG. 7, although only one stage thereof is shown for simplicity of illustration. An analog signal is low-pass filtered by a filter 90 before being applied to the input of the comb filter. The comb filter includes, in its signal delaying path, a PNP transistor 92 whose base is connected to the input of the filter by way of a capacitor $C_1$. The base of the transistor 92 is also connected to a voltage divider consisting of resistors $R_1$ and $R_2$, while the emitter thereof is connected to a DC voltage source through a resistor $R_3$. The collector of the transistor 92 is connected to the input stage 96 of a charge coupled device 98 (hereinafter referred to as a "CCD") of the type as disclosed in Kahng U.S. Pat. No. 3,700,932. A drive pulse generator 100 is connected to a three wire drive system for the CCD 98 to sequentially bias a plurality of field plates 102. Carriers representative of the analog input will be injected through the input stage 96 and be carried to an output stage 104 by the action of an apparent travelling field created along the surface of an insulating or semi-inculating body 106. The output of the CCD 98 is coupled to the input of an operational amplifier 108 where it is combined with the undelayed input signal transmitted through a change-over switch 110, a capacitor 112 and a resistor 114. The function of the operational amplifier 108 is to add or subtract the two input signals as well as to act as a current-voltage signal translator. The output of the operational amplifier 108 is supplied to a holer 116 for maintaining the peak value during each period of drive pulses, and then to a low-pass filter 118. Depending upon the position of the change-over switch 110, the filter of FIG. 8 represents a comb signal characteristic given as $\sin(\pi Tf)$ or $\cos(\pi Tf)$. It should be noted that in the comb filter of FIG. 7 comprising n stages of the configuration shown in FIG. 8, only two low-pass filters are required at the input and output of the filter.

In the foregoing, the invention has been described in conjunction with transmitting two channels of audio frequency signals across a single transmission channel. In light of the foregoing examples, it will be appreciated that the principle of this invention is also applicable to a multiplex system adapted to transmit a plurality, for example, three channels of audio signals. One example of such a multiplex system is a triplex system which uses comb filters of the $\cos^4(\pi Tf)$, $\sin^4(\pi Tf)$ and $\sin^2(2\pi Tf)$ type. Further, it has been found that with the utilization of comb filters having a variable passband characteristic, the quality of the signal as heard at the receiving terminal can be improved to some extent. Such comb filters can be realized by modulating or altering the coefficients, or alternatively, the time delay of the comb filters as hereinbefore discussed.

The novel system of this invention, in addition to transmitting more than one channel of audio signals by way of a single transmission channel, is also able to provide a stereophonic or quadrophonic sound system by the addition of a conventional recording and playback equipment. An example of a four-channel recording system is illustrated in FIG. 9.

In recent years, many stereophonic and quadrophonic sound systems have been proposed to accurately or faithfully reproduce concert hall sounds in the average room from a recording. These types of system utilize a multi-channel recording such as four-channels of recorded information which are respectively applied to four spatially related speakers. Four-channel tapes are usually available for recording such information; however, a disc record, which is lowest in cost, best in sound quality, and most widespread in use of home systems, can normally accommodate only two recording tracks and accordingly, expensive and complex electronic equipment will be required to record and play more than two tracks on a record. According to another feature of this invention, there is provided a four-channel recording system adapted for use with a record disc and which is simple in construction and efficient in operation. It should be understood, of course, that tapes can equally be used as a recording medium in the recording system of this invention.

Figure 9:
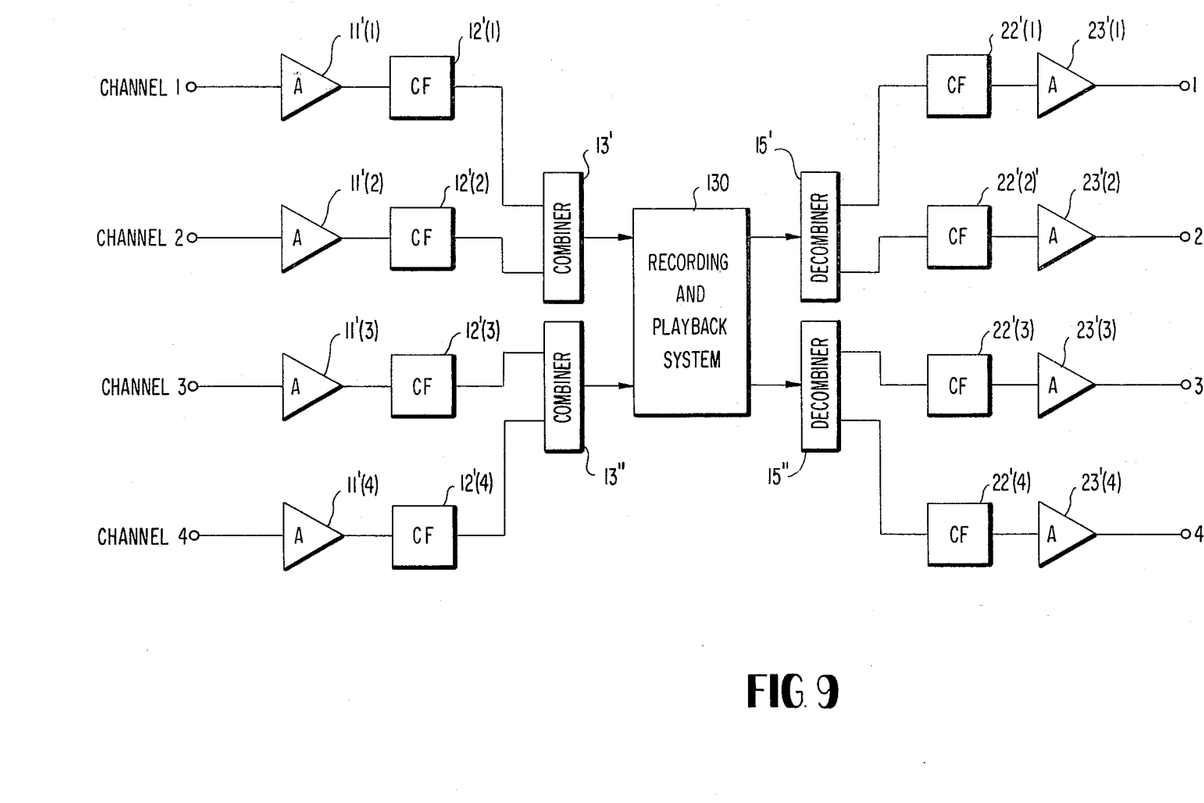
FIG. 9 is a block diagram illustrating a four-channel recording and playback arrangement according to another embodiment of this invention.

With reference to FIG. 9, it will be obvious that the arrangement as shown provides means for condensing four channels of information into two tracks. A recording and playback system 130 may be of the disc or magnetic tape type kind having two recording tracks. It is to be understood that if it is desired to record two channels of information on a single track, a single-track recording system may be used.

Similar to arrangement of FIG. 1, each channel signal is amplified by an amplifier 11' and then filtered by a comb filter 12'. The comb filters 12'(1) and 12'(2) have complementary comb signal characteristics as shown in FIGS. 2A and 2B, while the comb filters 12'(3) and 12'(4) likewise have complementary comb signal characteristics. The outputs from the comb filters 12'(1) and 12'(2) are combined by a first combiner 13' to form a first CFDD signal which is applied to a first channel of the recorder portion of the recording and playback system 130. In a similar manner, the outputs from the comb filters 12'(3) and 12'(4) are combined by a second combiner 13" to develop a second CFDD signal for application to a second channel of the recorder portion. The system 130 also contains a playback portion for reproducing two channels of recorded information. First and second decombiner circuits 15' and 15" are connected to the system 130 to receive the reproduced information from the first and second channels of the playback portion, respectively. The outputs from the first decombiner 15' are passed through a pair of comb filters 22'(1) and 22'(2), while the outputs from the decombiner 15" are transmitted through another pair of comb filters 22'(3) and 22'(4). As will be understood, each comb filter 22' has a response characteristic similar to that of the comb filter 12' in a corresponding input channel. After filtering by the comb filter 22', each channel signal is amplified by an amplifier 23' and then applied to the utilization means such as playback speakers (not shown).

Various additional modifications and extensions of this invention will become apparent to those skilled in the art. All such variations and deviations which basically rely on the teachings of this invention are properly considered within the spirit and scope of this invention.

What is claimed is:

1. A frequency division duplexed transmission system comprising:
    first and second input signal channels, each including means for converting applied analog signals into digital signals;
    first digital filter means provided in each of said first and second input signal channels for processing said digital signals, said first digital filter means having a comb signal characteristic, the attenuation bands of said first digital filter means in said first input signal channel coinciding with the pass bands of said first digital filter means in said second input signal channel;
    means for converting each of said processed digital signals into analog signals;
    first analog filter means for filtering each of said analog signals;
    means for combining the outputs of said first analog filter means;
    means for applying said combined signals to a transmission medium;
    means for receiving said combined signals;
    first and second output signal channels, each including means for converting said combined signals into digital signals;
    second digital filter means provided in each of said first and second output signal channels for processing said digital signals, each of said second digital filer means having the same response characteristic as that of said first digital filter means in a corresponding one of said input signal channels;
    means for converting each of said processed digital signals into analog signals; and
    second analog filter means for filtering each of said analog signals.

2. The system as defined in claim 1, wherein said first and second digital filter means each comprise a pair of nonrecursive digital filters of the tapped-delay-line type.

3. The system as defined in claim 2, wherein said nonrecursive digital filters each comprise;
    a plurality of serially connected delay units each for delaying each sample applied to it by a predetermined time;
    a plurality of multipliers, each solely associated with one of said delay units, each multiplying each of said delayed samples by a predetermined filter coefficient; and
    an adder for adding each of said multiplied samples to produce a filter output.

4. The system as defined in claim 3, wherein the complementary response characteristics of said nonrecursive digital filters are represented by $\cos^n(\pi Tf)$ and $\sin^n(\pi Tf)$, where $n$=the number of said delay units; $t$=the sampling interval; and $f$=the input signal frequency.

5. The system as defined in claim 1, wherein said first and second analog filter means have a low-pass signal characteristic.

6. The system as defined in claim 1, wherein said first and second digital filter means each comprise a pair of recursive digital filters having complementary signal characteristics.

7. The system as defined in claim 6, wherein said recursive digital filters each comprise:
    a delay unit for delaying each sample applied to it by a predetermined time;
    a multiplier for multiplying each of said delayed samples by a predetermined filter coefficient; and
    an adder for adding each of said multiplied samples and each sample applied to said delay unit to produce a filter output.

8. A frequency division duplexed transmission system comprising:
    first and second input signal channels;
    a first comb filter in each of said first and second input signal channels; the attenuation bands of said first comb filter in said first input signal channel coinciding with the pass bands of said first comb filter in said second input signal channel;

combiner means for combing the outputs of said first and second input signal channels;

means for applying the output of said combiner means to a transmission medium;

means for receiving such combiner means output;

first and second output signal channels, each having its input connected to the output of said receiving means; and a second comb filter in each of said first and second output signal channels, each said second comb filter having the same response characteristic as that of said first comb filter in a corresponding one of said first and second input signal channels, wherein said first and second comb filters each comprise a pair of n-stage delay positive and negative feed-forwarding circuits having complementary response characteristics, and wherein each stage of said delay positive feed-forward circuit comprises a delay unit for delaying an input signal, and an arithmetic unit for summing such delayed signal and undelayed input signal.

9. The system as defined in claim 8, wherein said delay unit is comprised of a charge coupled device.

10. The system as defined in claim 8, wherein the response characteristic of each stage of said delay positive feed-forward circuit is represented by $\cos(\pi Tf)$, where $T$=time delay provided by said delay unit; and $f$= the input signal frequency.

11. A frequency division duplexed transmission system comprising:

first and second input signal channels;

a first comb filter in each of said first and second input signal channels; the attenuation bands of said first comb filter in said first input signal channel coinciding with the pass bands of said first comb filter in said second input signal channel;

combiner means for combing the outputs of said first and second input signal channels;

means for applying the output of said combiner means to a transmission medium;

means for receiving such combiner means output;

first and second output signal channels, each having its input connected to the output of said receiving means; and a second comb filter in each of said first and second output signal channels, each said second comb filter having the same response characteristic as that of said first comb filter in a corresponding one of said first and second input signal channels, wherein said first and second comb filters each comprise a pair of n-stage delay positive and negative feed-forward circuits having complementary response characteristics, and wherein each stage of said delay negative feed-forward circuit comprises a delay unit for delaying an input signal, and an arithmetic unit for subtracting such delayed signal from the undelayed input signal.

12. The system as defined in claim 11, wherein said delay unit is comprised of a charge coupled device.

13. The system as defined in claim 11, wherein the response characteristic of each stage of said delay negative feed-forward circuit is represented by $\sin(\pi Tf)$, where $t$=time delay provided by said delay unit; and $f$=the input signal frequency.

14. A transmitter for transmitting a comb frequency division multiplex signal, comprising:

first and second input signal channels, each including means for converting applied analog signals into digital signals;

digital filter means provided in each of said first and second input signal channels for processing said digital signals, said digital filter means having a comb signal characteristic, the attenuation bands of said digital filter means in said first input signal channel coinciding with the pass bands of said digital filter means in said second input signal channel;

means for converting each of said processed digital signals into analog signals;

analog filter means for filtering each of said analog signals;

means for combining the outputs of said analog filter means; and means for applying said combined signals to a transmission medium;

said digital filter means comprising a pair of non-recursive digital filters of the tapped-delay-line type.

15. A receiver for receiving a comb frequency division multiplex signal, comprising:

means for receiving a comb frequency division multiplex signal;

first and second signal channels, each having its input connected to the output of said receiving means and including means for converting applied analog signals into digital signals;

digital filter means provided in each of said first and second signal channels for processing said digital signals, said digital filter means having a comb signal characteristic, the attenuation bands of said digital filter means in said first signal channel coinciding with the pass bands of said digital filter means in said second signal channel;

means provided in each of said first and second signal channels for converting said processed digital signals into analog signals; and analog filter means provided in each of said first and second signal channels for filtering said analog signals;

said digital filter means comprising a pair of non-recursive digital filters of the tapped-delay-line type.

* * * * *